(12) United States Patent
Nordskog

(10) Patent No.: US 11,717,018 B2
(45) Date of Patent: Aug. 8, 2023

(54) SMOKING ARTICLE COMPRISING AEROGEL

(71) Applicant: R.J. Reynolds Tobacco Company, Winston-Salem, NC (US)

(72) Inventor: Brian Keith Nordskog, Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 156 days.

(21) Appl. No.: 15/052,325

(22) Filed: Feb. 24, 2016

(65) Prior Publication Data

US 2017/0238607 A1 Aug. 24, 2017

(51) Int. Cl.
*A24F 47/00* (2020.01)
*A24B 15/16* (2020.01)
(Continued)

(52) U.S. Cl.
CPC ............ *A24B 15/165* (2013.01); *A24B 15/16* (2013.01); *A24D 1/02* (2013.01); *A24D 1/22* (2020.01); *A24D 3/048* (2013.01); *A24D 3/061* (2013.01); *A24D 3/066* (2013.01); *A24D 3/067* (2013.01); *A24D 3/14* (2013.01); *A24D 3/17* (2020.01);
(Continued)

(58) Field of Classification Search
CPC ........ A24F 47/00; A24F 47/006; A24B 15/16; A24B 15/165; A61M 16/14; B01J 20/20; B01J 21/18; B01J 20/28047; B01J 35/0013; B01J 23/06; B01J 23/10; B01J 23/72; B01J 23/745; A24D 1/02; A24D 3/14; A24D 3/067; A24D 3/061; A24D 3/066

See application file for complete search history.

(56) References Cited

U.S. PATENT DOCUMENTS 2,445,476 A 7/1948 Folkman
3,229,697 A * 1/1966 Maebashi ............... A24B 15/28
131/309
(Continued)

FOREIGN PATENT DOCUMENTS

CN 103462221 A 12/2013
EP 1 808 087 7/2007
(Continued)

OTHER PUBLICATIONS

"Pyrogel® 2250 Data Sheet," Aspen Aerogels, Aspen Aerogels, Inc., 2010, www.rcgroups.com/forums/showatt.php?attachmentid=3456457.*

*Primary Examiner* — Kelly M Gambetta
*Assistant Examiner* — Katherine A Will
(74) *Attorney, Agent, or Firm* — Womble Bond Dickinson (US) LLP

(57) ABSTRACT

A smoking article is provided that includes an aerogel, which can be optionally impregnated with a catalytic metal compound or can optionally be coated with at least one aerosol-forming material and a flavoring agent. The smoking article comprises various segments such as a heat generation segment, an aerosol-generation segment, and a mouth end. The aerogel can be placed near or within any of these segments.

The presence of the aerogel can reduce the concentration of certain gaseous components of mainstream smoke generated during use of a smoking article incorporating a heat generation segment containing a fuel element.

14 Claims, 2 Drawing Sheets

(51) Int. Cl.
| | |
|---|---|
| *A24D 3/06* | (2006.01) |
| *A24D 3/14* | (2006.01) |
| *A24D 1/22* | (2020.01) |
| *A24D 3/17* | (2020.01) |
| *A24D 3/04* | (2006.01) |
| *A24D 1/02* | (2006.01) |
| *B01J 20/20* | (2006.01) |
| *B01J 20/28* | (2006.01) |
| *B01J 21/18* | (2006.01) |
| *B01J 23/06* | (2006.01) |
| *B01J 23/10* | (2006.01) |
| *B01J 23/72* | (2006.01) |
| *B01J 23/745* | (2006.01) |
| *B01J 35/00* | (2006.01) |

(52) U.S. Cl.
CPC ......... *B01J 20/20* (2013.01); *B01J 20/28047* (2013.01); *B01J 21/18* (2013.01); *B01J 23/06* (2013.01); *B01J 23/10* (2013.01); *B01J 23/72* (2013.01); *B01J 23/745* (2013.01); *B01J 35/0013* (2013.01); *Y02C 20/40* (2020.08)

(56) References Cited

U.S. PATENT DOCUMENTS

| | | | |
|---|---|---|---|
| 3,308,600 | A | 3/1967 | Erdmann et al. |
| 4,280,187 | A | 7/1981 | Reuland et al. |
| 4,281,670 | A | 8/1981 | Heitmann et al. |
| 4,667,417 | A | 5/1987 | Graser et al. |
| 4,714,082 | A | 12/1987 | Banerjee et al. |
| 4,756,318 | A | 7/1988 | Clearman et al. |
| 4,771,795 | A | 9/1988 | White et al. |
| 4,807,809 | A | 2/1989 | Pryor et al. |
| 4,819,665 | A | 4/1989 | Roberts et al. |
| 4,850,301 | A | 7/1989 | Greene, Jr. et al. |
| 4,881,556 | A | 11/1989 | Clearman et al. |
| 4,893,637 | A | 1/1990 | Hancock et al. |
| 4,938,238 | A | 7/1990 | Barnes et al. |
| 4,981,522 | A * | 1/1991 | Nichols ................ A24B 15/165 131/194 |
| 4,989,619 | A | 2/1991 | Clearman et al. |
| 4,997,804 | A | 3/1991 | Pekala |
| 5,020,548 | A | 6/1991 | Farrier et al. |
| 5,025,814 | A | 6/1991 | Raker |
| 5,027,836 | A | 7/1991 | Shannon et al. |
| 5,027,837 | A | 7/1991 | Clearman et al. |
| 5,065,776 | A | 11/1991 | Lawson et al. |
| 5,067,499 | A * | 11/1991 | Banerjee ................ A24D 1/18 131/194 |
| 5,076,297 | A | 12/1991 | Farrier et al. |
| 5,086,085 | A | 2/1992 | Pekala |
| 5,099,861 | A | 3/1992 | Clearman et al. |
| 5,105,831 | A * | 4/1992 | Banerjee ............... A24F 47/004 131/194 |
| 5,105,838 | A | 4/1992 | White et al. |
| 5,129,409 | A | 7/1992 | White et al. |
| 5,148,821 | A | 9/1992 | Best et al. |
| 5,156,170 | A | 10/1992 | Clearman et al. |
| 5,178,167 | A | 1/1993 | Riggs et al. |
| 5,207,814 | A | 5/1993 | Cogliati et al. |
| 5,211,684 | A | 5/1993 | Shannon et al. |
| 5,247,947 | A | 9/1993 | Clearman et al. |
| 5,275,796 | A | 1/1994 | Tillotson et al. |
| 5,303,720 | A | 4/1994 | Banerjee et al. |
| 5,306,555 | A | 4/1994 | Ramamurthi et al. |
| 5,345,955 | A | 9/1994 | Clearman et al. |
| 5,395,805 | A | 3/1995 | Droege et al. |
| 5,396,911 | A | 3/1995 | Casey, III et al. |
| 5,469,871 | A | 11/1995 | Barnes et al. |
| 5,529,971 | A | 6/1996 | Kaschmitter et al. |
| 5,546,965 | A | 8/1996 | White |
| 5,551,451 | A | 9/1996 | Riggs et al. |
| 5,560,376 | A | 10/1996 | Meiring et al. |
| 5,706,834 | A | 1/1998 | Meiring et al. |
| 5,724,997 | A | 3/1998 | Smith et al. |
| 5,727,571 | A | 3/1998 | Meiring et al. |
| 5,744,510 | A | 4/1998 | Pekala |
| 5,789,338 | A | 8/1998 | Kaschmitter et al. |
| 5,902,431 | A | 5/1999 | Wilkinson et al. |
| 5,911,658 | A | 6/1999 | Yoldas |
| 5,942,553 | A | 8/1999 | Biesmans et al. |
| 5,944,025 | A | 8/1999 | Cook et al. |
| 6,090,861 | A | 7/2000 | Mendenhall et al. |
| 6,095,152 | A * | 8/2000 | Beven ................ A24B 15/165 131/194 |
| 6,197,270 | B1 | 3/2001 | Sonoda et al. |
| 6,229,115 | B1 | 5/2001 | Voss et al. |
| 6,271,170 | B1 | 8/2001 | Suh et al. |
| 6,307,116 | B1 | 10/2001 | Heinrichs et al. |
| 6,598,607 | B2 * | 7/2003 | Adiga ................... A24F 47/004 131/194 |
| 6,737,445 | B2 | 5/2004 | Bell et al. |
| 6,874,508 | B2 | 4/2005 | Shafer et al. |
| 7,071,287 | B2 | 7/2006 | Rhine et al. |
| 7,296,578 | B2 | 11/2007 | Read, Jr. |
| 7,378,450 | B2 | 5/2008 | Erkey et al. |
| 7,434,585 | B2 | 10/2008 | Holmes |
| 7,503,330 | B2 | 3/2009 | Borschke et al. |
| 7,569,510 | B2 * | 8/2009 | Deevi ...................... B01J 23/52 131/331 |
| 7,753,056 | B2 | 7/2010 | Borschke et al. |
| 7,793,665 | B2 | 9/2010 | Dube et al. |
| 7,836,897 | B2 | 11/2010 | Borschke et al. |
| 8,119,700 | B2 | 2/2012 | Park et al. |
| 8,222,302 | B2 | 7/2012 | Yeung et al. |
| 8,375,958 | B2 | 2/2013 | Hutchens |
| 8,408,216 | B2 * | 4/2013 | Luan .................... A24B 15/283 131/335 |
| 8,424,538 | B2 | 4/2013 | Thomas et al. |
| 8,436,065 | B2 | 5/2013 | Hwang et al. |
| 8,464,726 | B2 | 6/2013 | Sebastian et al. |
| 8,469,035 | B2 | 6/2013 | Banerjee et al. |
| 8,470,901 | B2 | 6/2013 | Park et al. |
| 8,518,335 | B2 | 8/2013 | Joung et al. |
| 8,629,076 | B2 | 1/2014 | Worsley et al. |
| 8,865,351 | B2 | 10/2014 | Mayes et al. |
| 8,871,821 | B2 | 10/2014 | Wang et al. |
| 8,894,893 | B2 | 11/2014 | Ahn et al. |
| 9,073,759 | B2 | 7/2015 | Zeng et al. |
| 9,102,076 | B2 | 8/2015 | Doshi et al. |
| 9,115,025 | B2 | 8/2015 | Bauer et al. |
| 2002/0122761 | A1 | 9/2002 | Coulson et al. |
| 2004/0159327 | A1 * | 8/2004 | Dante ..................... A24D 1/00 131/337 |
| 2004/0173229 | A1 | 9/2004 | Crooks et al. |
| 2004/0226568 | A1 * | 11/2004 | Takeuchi ............... A24B 15/16 131/194 |
| 2005/0066986 | A1 | 3/2005 | Nestor et al. |
| 2005/0274390 | A1 | 12/2005 | Banerjee et al. |
| 2006/0169295 | A1 | 8/2006 | Draghetti |
| 2007/0204870 | A1 | 9/2007 | Deevi et al. |
| 2007/0215167 | A1 | 9/2007 | Llewellyn Crooks et al. |
| 2007/0215168 | A1 | 9/2007 | Banerjee et al. |
| 2008/0142028 | A1 | 6/2008 | Fagg |
| 2009/0044818 | A1 | 2/2009 | Takeuchi et al. |
| 2010/0186757 | A1 | 7/2010 | Crooks et al. |
| 2012/0042885 | A1 | 2/2012 | Stone et al. |
| 2012/0222690 | A1 * | 9/2012 | Branton ................ A24D 3/067 131/332 |
| 2013/0019888 | A1 | 1/2013 | Tsuruizumi et al. |
| 2013/0042865 | A1 * | 2/2013 | Monsees ............... A61M 15/06 128/203.27 |
| 2013/0133675 | A1 | 5/2013 | Shinozaki et al. |
| 2013/0136664 | A1 * | 5/2013 | Bono ...................... B01J 23/72 422/180 |
| 2013/0146075 | A1 | 6/2013 | Poget et al. |
| 2013/0233329 | A1 | 9/2013 | Sebastian et al. |
| 2013/0269720 | A1 | 10/2013 | Stone et al. |
| 2014/0305455 | A1 * | 10/2014 | Crooks ................... A24D 3/061 131/332 |

(56) References Cited

U.S. PATENT DOCUMENTS

| | | | | |
|---|---|---|---|---|
| 2014/0356607 A1* | 12/2014 | Woodcock | ............ | A24F 47/006 |
| | | | | 428/220 |
| 2015/0128963 A1* | 5/2015 | Rasouli | ................ | A24D 3/061 |
| | | | | 131/88 |
| 2016/0198771 A1* | 7/2016 | Goggin | ................ | A24F 47/008 |
| | | | | 131/329 |
| 2017/0119050 A1* | 5/2017 | Blandino | .............. | A24F 47/008 |
| 2018/0116280 A1* | 5/2018 | Maiwald | ............... | A24F 47/006 |

FOREIGN PATENT DOCUMENTS

| | | | | |
|---|---|---|---|---|
| EP | 2 550 879 | | 1/2013 | |
| JP | S58141776 | | 8/1983 | |
| JP | H06-94003 B | | 1/1991 | |
| WO | WO 02/37990 | | 5/2002 | |
| WO | WO 2004/110186 A1 | | 12/2004 | |
| WO | WO2005/055747 A2 | | 6/2005 | |
| WO | WO2010/120813 A2 | | 10/2010 | |
| WO | WO 2011/139730 | | 11/2011 | |
| WO | WO 2013/098380 | | 7/2013 | |
| WO | WO 2013/098405 | | 7/2013 | |
| WO | WO 2013/098410 | | 7/2013 | |
| WO | WO 2013/104914 | | 7/2013 | |
| WO | WO 2013/120849 | | 8/2013 | |
| WO | WO 2013/120854 | | 8/2013 | |
| WO | WO 2014/155252 | | 10/2014 | |
| WO | WO-2014155252 A2 * | 10/2014 | ........... | A24D 3/0229 |

* cited by examiner

SMOKING ARTICLE COMPRISING AEROGEL

FIELD OF THE INVENTION

The present invention relates to products made or derived from tobacco, or that otherwise incorporate tobacco, and are intended for human consumption.

BACKGROUND OF THE INVENTION

Popular smoking articles, such as cigarettes, have a substantially cylindrical rod-shaped structure and include a charge, roll or column of smokable material, such as shredded tobacco (e.g., in cut filler form), surrounded by a paper wrapper, thereby forming a so-called "smokable rod," "tobacco rod" or "cigarette rod." Normally, a cigarette has a cylindrical filter element aligned in an end-to-end relationship with the tobacco rod. Preferably, a filter element comprises plasticized cellulose acetate tow circumscribed by a paper material known as "plug wrap." Certain filter elements can incorporate polyhydric alcohols. See, for example, UK Pat. Spec. 755,475. Certain cigarettes incorporate a filter element having multiple segments, and one of those segments can comprise activated charcoal particles. See, for example, U.S. Pat. No. 5,360,023 to Blakley et al. and 6,537,186 to Veluz. Preferably, the filter element is attached to one end of the tobacco rod using a circumscribing wrapping material known as "tipping paper." It also has become desirable to perforate the tipping material and plug wrap, in order to provide dilution of drawn mainstream smoke with ambient air. Descriptions of cigarettes and the various components thereof are set forth in Tobacco Production, Chemistry and Technology, Davis et al. (Eds.) (1999). A cigarette is employed by a smoker by lighting one end thereof and burning the tobacco rod. The smoker then receives mainstream smoke into his/her mouth by drawing on the opposite end (e.g., the filter end) of the cigarette.

Through the years, there have been proposed various methods for altering the composition of mainstream tobacco smoke. In PCT Application Pub. No. WO 02/37990 to Bereman, it has been suggested that metallic particles and/or carbonaceous particles can be incorporated into the smokable material of a cigarette in an attempt to reduce the amounts of certain compounds in the smoke produced by that cigarette. In U.S. Patent Application Pub. No. 2005/0066986 to Nestor et al., it has been suggested that a tobacco rod can incorporate tobacco filler combined with an aerosol-forming material, such as glycerin. U.S. Pat. No. 6,874,508 to Shafer et al. proposes a cigarette having a paper wrapped tobacco rod having a tip portion that is treated with an additive, such as potassium bicarbonate, sodium chloride or potassium phosphate.

Various tobacco substitute materials have been proposed, and substantial listings of examples of such materials can be found in U.S. Pat. No. 4,079,742 to Rainer et al. and 4,771,795 to White et al. References describing tobacco substitutes are also set forth in the background section of U.S. Patent Application Pub. No. 2007/0215168 to Banerjee et al.

Numerous references have proposed various smoking articles of altered format and configuration, or of a type that generate flavored vapor, visible aerosol, or a mixture of flavored vapor and visible aerosol. See, for example, those references set forth in the background section of US 2007/0215168 to Banerjee et al. Furthermore, certain types of such smoking articles have been commercially marketed under the brand names "Premier" and "Eclipse" by R. J. Reynolds Tobacco Company, and under the brand name "Accord" by Philip Morris Inc. More recently, it has been suggested that the carbonaceous fuel elements of those types of cigarettes can incorporate ultrafine particles of metals and metal oxides. See, for example, US Pat. Application Pub. No. 2005/0274390 to Banerjee et al., which is incorporated by reference herein.

Smoking articles that employ tobacco substitute materials and smoking articles that employ sources of heat other than tobacco cut filler to produce tobacco-flavored vapors or tobacco-flavored visible aerosols have not received widespread commercial success. However, it would be highly desirable to provide a smoking article that demonstrates the ability to provide to a smoker many of the benefits and advantages of conventional cigarette smoking, while reducing delivery of incomplete combustion and pyrolysis products.

BRIEF SUMMARY OF THE DISCLOSURE

The above and other needs are met by aspects of the present disclosure which, in one aspect, provides an elongate smoking article having a lighting end and an opposed mouth end. The invention provides smoking articles that include an aerogel, which can be optionally impregnated with a catalytic metal compound or optionally coated with at least one aerosol-forming material and/or a flavoring agent. The smoking article comprises various segments such as a heat generation segment, an aerosol-generation segment, and a mouth end. The aerogel can be placed near or within any of these segments. For example, in some embodiments, the aerogel can be placed adjacent to the heat generation segment. In another embodiment, the aerosol-generation segment can comprise an aerogel. In another embodiment, the mouth end can comprise an aerogel.

The presence of the aerogel composition can reduce the concentration of certain gaseous components of mainstream smoke generated during use of a smoking article incorporating a heat generation segment containing a fuel element.

In one aspect of the invention, a smoking article comprises a lighting end; a mouth end; an optional catalyst segment, and an aerosol-generation segment, the lighting end comprises a heat generation segment, said heat generation segment including a fuel element, wherein at least one of the catalyst segment and the aerosol-generation segment comprises an aerogel, and each segment is physically separate and in a heat exchange relationship. In some embodiments, the aerosol-generating segment incorporates glycerin, propylene glycol, or a combination thereof. In another embodiment, the aerogel comprises a metal selected from the group consisting of alkali metals, alkaline earth metals, transition metals in Groups IIIB, IVB, VB, VIB VIIB, VIIIB, IB, and IIB, Group IIIA elements, Group IVA elements, lanthanides, actinides and combinations thereof. In further embodiments, the aerogel comprises a metal selected from silicon, copper, iron, titania, aluminum, nickel, palladium, platinum, cobalt or a combination thereof. In another embodiment, the aerogel is a silica aerogel, a metal oxide aerogel, an organic aerogel, a carbon aerogel, a chalcogenide aerogel, a nanotube containing aerogel, or a metal aerogel. In one specific embodiment the aerogel is a carbon aerogel. In another specific embodiment, the aerogel is a metal oxide aerogel. In another embodiment, the metal oxide aerogel comprises a metal selected from the group consisting of transition metals in Groups IVB, VB, VIB VIIIB, IB, and IIB, Group IIIA elements, Group IVA elements, and combinations thereof. In some embodiments, the aerogel adsorbs carbon monoxide in mainstream smoke or catalyzes the conversion of carbon monoxide to carbon dioxide. In one or more embodiments, the aerogel is impregnated with a catalytic metal compound. In some embodiments, the loading of the catalytic metal compound on the aerogel is from about 0.1% to about 50%, based on the total dry weight of the aerogel. In some embodiments, the catalytic metal compound comprises a metal selected from the group consisting of alkali metals, alkaline earth metals, transition metals in Groups IIIB, IVB, VB, VIB VIIB, VIIIB, IB, and IIB, Group IIIA elements, Group IVA elements, lanthanides, actinides and combinations thereof. In another embodiment, the catalytic metal compound comprises a metal selected from the group consisting of Ti, Zr, Hf, V, Nb, Ta, Cr, Mo, W, Mn, Re, Fe, Co, Ni, Ru, Rh, Pd, Os, Ir, Cu, Ag, Au, Zn, Y, Ce, Na, K, Cs, Mg, Ca, B, Al, Si, Ge, Sn, and combinations thereof. In another embodiment, the catalytic metal compound comprises a metal selected from the group consisting of iron, copper, zinc, cerium, silver and combinations thereof. In some embodiments, the aerogel comprises a bulk density ranging from about 0.5 to about 0.01 g/cm$^3$. In another embodiment, the aerogel comprises a surface area ranging from about 100 to about 1000 m$^2$/g. In another embodiment, the aerogel is mesoporous. In some embodiments, the aerogel comprises of spherical particles of an average particle size range of about 1 μm to about 250 μm. In another embodiment, the aerogel comprises from about 0.5 to about 50 wt. % of the smoking article. In some embodiments, the catalyst segment is positioned downstream the heat generation segment and upstream the aerosol-generating segment. In another embodiment, the aerosol-generating segment comprises tobacco treated with one or both aerosol-forming material and a flavoring agent. In another embodiment, the smoking article is a cigarette.

In another aspect of the invention, a smoking article comprises a lighting end; a mouth end; and an aerosol-generation segment, the lighting end comprises a heat generation segment, said heat generation segment including a fuel element, the mouth end comprises a filter, said filter including an aerogel, and each segment is physically separate and in a heat exchange relationship. In some embodiments, the aerogel captures or converts smoke constituents. In another embodiment, the mouth end comprises a porous monolith aerogel. In another embodiment, the mouth end comprises a plurality of aerogel particles dispersed in the filter. In some embodiments, the aerogel is a silica aerogel, a metal oxide aerogel, an organic aerogel, a carbon aerogel, a chalcogenide aerogel, a nanotube containing aerogel, or a metal aerogel. In a specific embodiment, the aerogel is a carbon aerogel. In another embodiment, the aerogel comprises a bulk density ranging from about 0.5 to about 0.01 g/cm$^3$. In another embodiment, the aerogel comprises a surface area ranging from about 100 to about 1000 m$^2$/g. In another embodiment, the aerogel is mesoporous. In certain embodiments, the aerogel comprises of spherical particles of an average range of about 1 μm to about 250 μm. In another embodiment, the aerogel comprises from about 0.5 wt. % to about 50 wt. % of the smoking article.

Further features and advantages of the present disclosure are set forth in more detail in the following description.

BRIEF DESCRIPTION OF THE DRAWINGS

Figure 1:
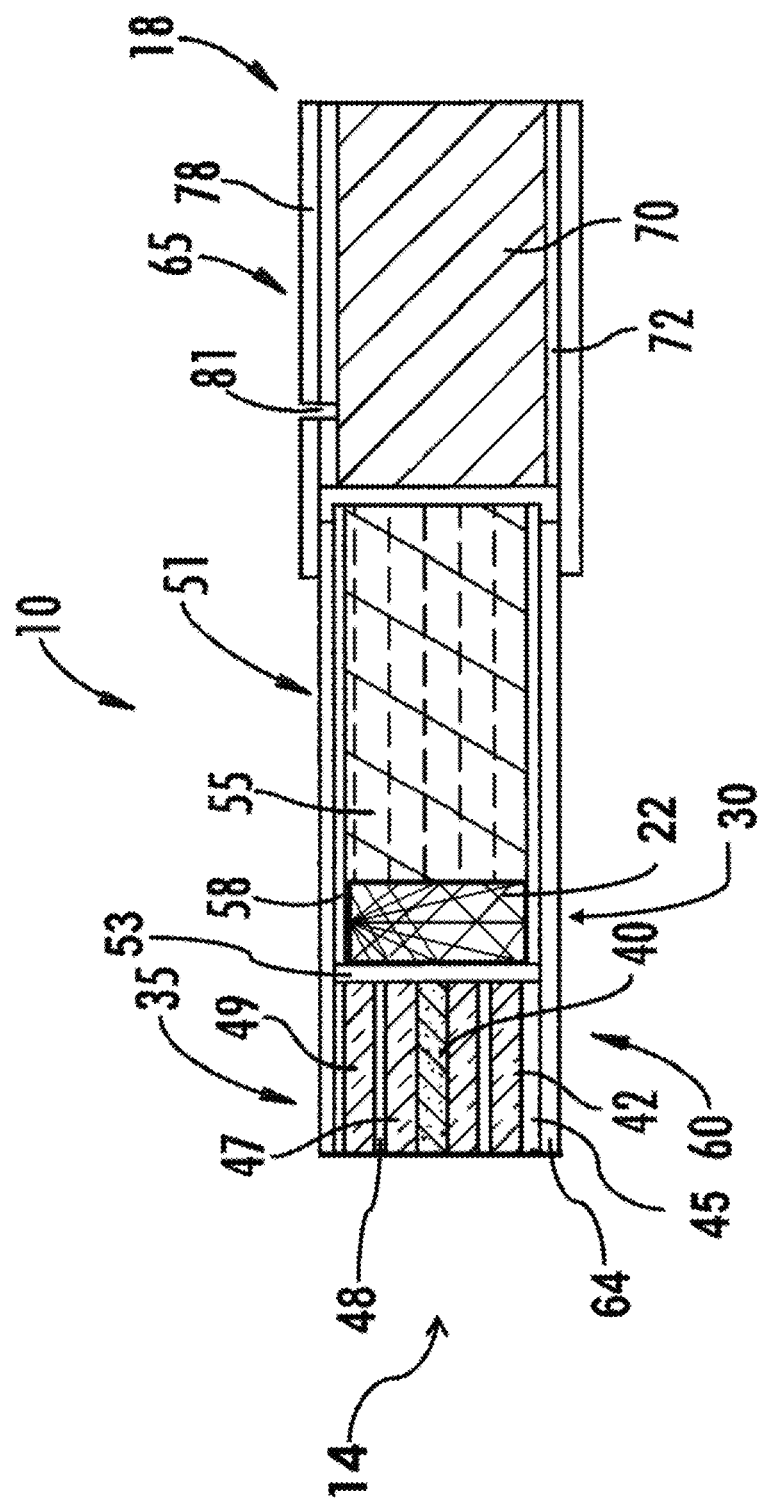
Figure 2:

Having thus described the disclosure in general terms, reference will now be made to the accompanying drawing, which is not necessarily drawn to scale, and wherein:

FIG. 1 provides a longitudinal cross-sectional view of a representative smoking article;

FIG. 2 is an image showing a supercritically-dried aerogel; and

Figure 3:
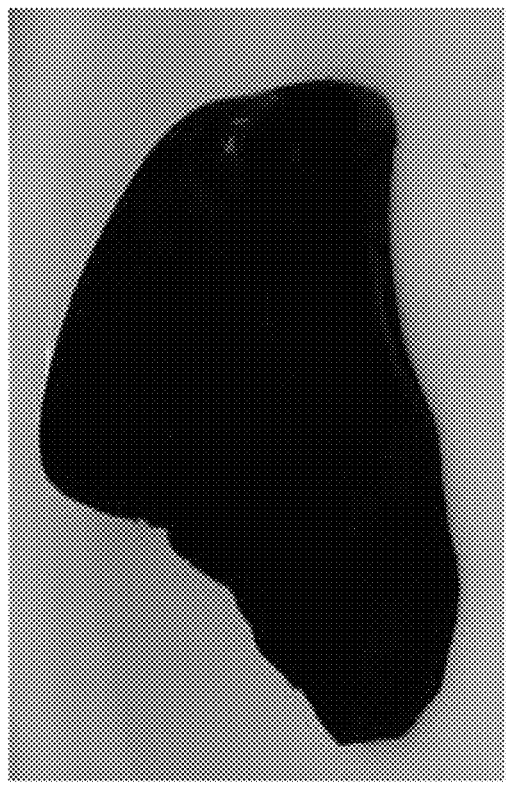

FIG. 3 is an image showing a carbon aerogel.

DETAILED DESCRIPTION OF THE PREFERRED EMBODIMENTS

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. Like components are given like numeric designations throughout the figures. As used in this specification and the claims, the singular forms "a," "an," and "the" include plural referents unless the context clearly dictates otherwise.

The invention provides smoking articles that include an aerogel, which can be optionally impregnated with a catalytic metal compound or can optionally be coated with at least one aerosol-forming material and/or a flavoring agent. The smoking article comprises various segments such as a heat generation segment, an aerosol-generation segment, and a mouth end. The aerogel can be placed near or within any of these segments. For example, in some embodiments, the aerogel can be placed adjacent to the heat generation segment. In another embodiment, the aerosol-generation segment can comprise an aerogel. In another embodiment, the mouth end can comprise an aerogel. The aerogel can provide several functions in the smoking article, including use as a gas-permeable support for a catalyst or filtration material, as a structural supporting element providing strength at low weight, or as a gas-permeable substrate for delivery of an aerosol to the user, such as use as a substrate for aerosol-forming material or a flavorant. In certain embodiments, the presence of the aerogel can reduce the concentration of certain gaseous components of mainstream smoke generated during use of a smoking article incorporating a heat generation segment containing a fuel element.

Aerogel Composition

The smoking article of the current invention comprises an aerogel. As used herein, the term "aerogel" refers to an open-celled, mesoporous, solid foam made from a metal-based or organic-based compound that is composed of a network of interconnected nanostructures and that exhibits porosity (non-solid volume) of no less than about 50%. The aerogel can capture or convert smoke constituents. The aerogel can either directly react with one or more gas phase components of mainstream smoke generated by a smoking article or catalyze a reaction involving a gas phase component of mainstream smoke or both, such that concentration of the gas phase component is reduced. The aerogel may also absorb or trap one or more gas phase components of mainstream smoke generated by a smoking article, such that concentration of the gas phase component is reduced. The aerogel may be optionally impregnated with a catalytic metal compound or may be coated with at least one aerosol-forming material and/or flavoring agent.

As mentioned above, aerogels are a diverse class of dry, porous, solid materials exhibiting a low-density, porous, solid framework of a gel (the part of a gel that gives the gel its solid-like cohesiveness) isolated in-tact from the gel's liquid component (the part that makes up most of the volume of the gel). Aerogels are open-porous (that is, the gas in the aerogel is not trapped inside solid pockets) and have pores in the range of <1 to 100 nanometers (billionths of a meter) in diameter, typically <20 nm. Generally, the majority of aerogels are described as "mesoporous", which refers to a material that contains pores ranging from 2 to 50 nm in diameter. Most of the pores in an aerogel fall within this size range and exhibit about between 90 to 99.8+% porosity and also contain a significant amount of microporosity (pores less than 2 nm in diameter). In one or more embodiments, the aerogel is mesoporous. The poor volume of the aerogel is dependent on the diameter of the pore and can typically range from about 0.01 to about 10 cm$^3$/g.

The aerogel can be in the form of a single monolithic structure or in the form of a plurality of particles. For example, an aerogel material can be cut into a predetermined shape (e.g., a cylindrical shape) for use in a smoking article of the invention or milled into a granular or particulate form. When used in particulate form, the particle size of the aerogel can vary. Typically, the aerogel comprises particles (e.g., substantially spherical particles) of an average particle size range of about 0.001 μm to about 250 μm, preferably 1 μm to about 250 μm.

Furthermore, the aerogel comprises a bulk density ranging from about 0.01 to about 0.5 g/cm$^3$. The bulk density may be dependent on the composition of the aerogel and the density of the precursor gel used to make the aerogel.

In addition, the aerogel comprises a surface area ranging from about 100 to about 1000 m$^2$/g. The size of the surface area may be dependent on the composition of the aerogel and the density of the precursor gel used to make the aerogel.

In certain embodiments, the aerogel is selected from a silica aerogel, a metal oxide aerogel, an organic aerogel, a carbon aerogel, a chalcogenide aerogel, a nanotube containing aerogel, or a metal aerogel.

In some embodiment, the aerogel composition contains a metal compound. Examples of metals present in the a metal compound of the aerogel composition include, but are not limited to, alkali metals, alkaline earth metals, transition metals in Groups IIIB, IVB, VB, VIB VIIIB, IB, and IIB, Group IIIA elements, Group IVA elements, lanthanides, and actinides. Specific exemplary metal elements include silicon, copper, iron, titania, aluminum, nickel, palladium, platinum, cobalt or a combination thereof.

Aerogels are formed by creating a gel in solution and then carefully removing the liquid to leave the aerogel structure intact. Generally, a gel is produced by combining a metal-based compound precursor, a gelling agent and a liquid. The metal-based compound precursor can be selected from any metal salt or metal alkoxide. For example, the metal salt is independently selected from a chloride, nitrate, acetate, oxychloride, or a combination thereof, but not limited to these specific salts. In another example, the metal alkoxide is independently selected from a methoxide, ethoxide, tert-butoxide, or a combination thereof, but not limited to these specific alkoxides. The gelling agent promotes formation of the gel and can be acidic or basic in nature including but not limited to mineral acids or ammonia based compounds and precursors (e.g., NH$_4$Cl). The liquid is an organic solvent when the metal precursor is a metal alkoxide but is an aqueous solvent when the metal precursor is a metal salt. Examples of organic solvents include, but are not limited to, alcohols, acetone, methylene chloride, benzene, toluene, acetonitrile, and a combination thereof.

In many embodiments, the liquid is removed from the gel via supercritical extraction or supercritical drying. Exemplatory preparations of metal containing aerogels are described in U.S. Pat. No. 8,436,065 to Hwang et al.; U.S. Pat. No. 8,518,335 to Joung et al.; U.S. Pat. No. 8,894,893 to Ahn et al.; U.S. Pat. No. 9,073,759 to Zeng et al.; U.S. Pat. No. 9,102,076 to Doshi et al.; U.S. Pat. No. 9,115,025 to Bauer et al.; U.S. Pat. No. 5,395,805 to Droege et al.; U.S. Pat. No. 5,911,658 to Yoldas et al.; U.S. Pat. No. 6,197,270 to Sonoda et al.; U.S. Pat. No. 6,307,116 to Heinrichs et al.; U.S. Pat. No. 6,271,170 to Jin et al.; U.S. Pat. No. 7,071,287 to Rhine et al.; U.S. Pat. No. 7,378,450 to Erkey et al.; U.S. Pat. No. 8,222,302 to Yeung et al.; U.S. Pat. No. 5,275,796 to Tillotson et al.; U.S. Pat. No. 5,207,814 to Cogliati et al.; U.S. Pat. No. 4,667,417 to Graser et al.; and U.S. Pat. No. 8,629,076 to Worsley et al. which are incorporated by reference herein in their entirety.

In certain embodiments, the aerogel is an organic or carbon aerogel. Organic aerogels comprise at least about 75% by weight, more preferably at least 90% by weight of organic compounds. Organic compounds include any compound commonly referred to as organic, for example those falling under the IUPAC nomenclature of organic chemistry. Organic aerogels comprise elements such as carbon, nitrogen, oxygen, phosphorus, and sulfur. Examples include natural or synthetic polymers, sugars, proteins, cellulosic materials and the like. Some of these materials may be carbonized, pyrolyzed, or otherwise heated in order to create activated carbon structures to generate a carbon aerogel.

For example, in one embodiment the organic aerogel is a resorcinol-formaldehyde aerogel composition, which can be pyrolyzed to make a carbon aerogel. The resorcinol-formaldehyde gel composition can be prepared by polymerizing organic compounds resorcinol and formaldehyde in an aqueous solution in the presence of a basic polymerization catalyst (e.g., sodium carbonate). In one embodiment, the polymerization may occur at elevated temperature. The formed resorcinol-formaldehyde gel can then be washed and dried to obtain the resorcinol-formaldehyde aerogel composition. For example, in some embodiments, the resorcinol-formaldehyde gel is washed in an organic solvent until all of the water has been exchanged from the gel with the organic solvent, which can be an alcohol, acetone and the like. Drying of the washed gel is accomplished with supercritical drying methods using carbon dioxide to obtain the resorcinol-formaldehyde aerogel composition. The surface area and density of the resorcinol-formaldehyde aerogel composition is dependent on the ratio of resorcinol and catalyst used when preparing the gel. For example, a ratio of about 50 can afford an aerogel with a surface area of about 900 m$^2$/g, whereas a ratio of about 200 can afford an aerogel with a surface area of about 575 m$^2$/g. In one embodiment, the organic aerogel can be pyrolyzed at a temperature range of about 400° C. to about 1400° C. for a time period ranging from about 1 to about 24 hours. In some embodiments, the temperature range is of about 600° C. to about 1050° C. for about 1 to about 3 hours. The temperature used for pyrrolysis can determine the extent of cabonization and/or graphitization of the gel. Exemplatory preparations of organic and carbon aerogels are described in U.S. Pat. No. 8,436,060 to Kim et al.; U.S. Pat. No. 8,119,700 to Park et al.; U.S. Pat. No. 6,090,861 to Mendenhall et al.; U.S. Pat. No. 5,942,553 to Biesmans et al.; U.S. Pat. No. 5,744,510 to Pekala et al.; U.S. Pat. No. 5,306,555 to Ramamurthi et al.; U.S. Pat. No. 5,086,085 to Pekala et al.; U.S. Pat. No. 4,997,804 to Pekala et al.; U.S. Pat. No. 8,865,351 to Mayes et al.; U.S. Pat. No. 8,871,821 to Wang et al.; U.S. Pat. No. 8,470,901 to Park et al.; U.S. Pat. No. 8,119,700 to Park et al.; U.S. Pat. No. 6,737,445 to Bell et al.; U.S. Pat. No. 5,529,971 to Kaschmitter et al.; and U.S. Pat. No. 5,789,338 to Kaschmitter et al. which are incorporated by reference herein in their entirety.

The invention further provides smoking articles that include an aerogel, which can be optionally impregnated with a catalytic metal compound. Examples of metals present in the a catalytic metal compound of the aerogel include, but are not limited to, alkali metals, alkaline earth metals, transition metals in Groups IIIB, IVB, VB, VIB VIIB, VIIIB, IB, and IIB, Group IIIA elements, Group IVA elements, lanthanides, and actinides. Specific exemplary metal elements include silicon, copper, iron, titania, aluminum, nickel, palladium, platinum, cobalt or a combination thereof.

Catalytic metal compounds can be used in a variety of solid particulate forms including precipitated metal particles, metal oxide particles (e.g., iron oxides, copper oxide, zinc oxide, and cerium oxide), and supported catalyst particles wherein the catalytic metal compound is dispersed within a porous supporting material (e.g., molecular sieve). The particle size of the catalytic metal compounds can vary, but is typically between about 1 nm to about 1 micron.

In the methods of the invention, the catalytic metal compound may be prepared from thermal decomposition of a metal precursor. The metal precursor can be applied to the aerogel in the form of a solid particulate material or in the form of a suspension or solution comprising a solvent. Solvents that may be used include water (e.g., deionized water), pentanes, hexanes, cyclohexanes, xylenes, mineral spirits, alcohols (e.g., methanol, ethanol, propanol, isopropanol and butanol), and mixtures thereof. Stabilizers, such as acetic acid, nitric acid, and certain organic compounds, can be added to the metal precursor suspensions or solutions. Applying the metal precursor to the aerogel as a suspension or solution can be advantageous because of the greater solubility of the metal precursors in water (and other common solvents) as compared to the catalytic metal compound. The greater solubility of the precursor results in active catalyst sites that tend to be more uniformly distributed throughout the aerogel in precursor-treated aerogel as compared to a aerogel treated directly with the catalytic metal compound. In some embodiments, the mixing of the metal precursor with the aerogel in solution can occur at elevated temperature.

The metal precursor is any compound that thermally decomposes to form a catalytic metal compound. Exemplary metal precursors include metal salts (e.g., metal citrates, hydrides, thiolates, amides, nitrates, ammonium nitrates, carbonates, cyanates, sulfates, bromides, chlorides, as well as hydrates thereof) and metal organic compounds comprising a metal atom bonded to an organic radical (e.g., metal alkoxides, β-diketonates, carboxylates and oxalates). US 2007/0251658 to Gedevanishvili et al., which is incorporated by reference herein in its entirety, discloses a variety of metal precursors that can be used in the invention. Exemplary metal salts that can be used include iron nitrate, copper nitrate, cerium nitrate, cerium ammonium nitrate, manganese nitrate, magnesium nitrate, zinc nitrate, and the hydrates thereof. Combinations of multiple metal precursors or combinations of a metal precursor with a metal compound can be used to treat the aerogel. Where multiple metal precursors and/or metal compounds are used, the various components of the combination can be added to the aerogel together or separately.

The metal precursor may also be deposited onto the surface of the aerogel by removing the liquid, such as by evaporation so that the metal precursor remains on the aerogel. The liquid may be substantially removed from the support during or prior to thermally treating the metal precursor, such as heating the aerogel at a temperature higher than the boiling point of the liquid or by reducing the pressure of the atmosphere surrounding the aerogel. The impregnated aerogel can then be dried in an oven.

The amount of metal precursor added to the aerogel will depend, at least in part, on the desired amount of catalytic metal compound present in the aerogel. The amount of metal precursor typically applied to, or incorporated within, a representative aerogel can range from about 1 mg to about 200 mg. Generally, that amount is at least about 5 mg, and often at least about 10 mg. Typically, the amount does not exceed about 100 mg, and often does not exceed about 50 mg. Frequently, the amount can be from about 5 mg to about 20 mg The amount of loading of the metal precursor onto the aerogel can vary, but will typically be from about 0.1% to about 50% based on the total dry weight of the aerogel.

In some embodiments, following treatment of the aerogel with the metal precursor, the aerogel is subjected to a heat treatment in order to thermally decompose the metal precursor and form the desired catalytic metal compound, or subjected to microwave irradiation at an appropriate wavelength, intensity and duration to convert the metal precursor to a catalytic metal compound. The heat treatment step can proceed for a time and at a temperature sufficient to convert the metal precursor to the desired catalytic metal compound. In certain embodiments, this treatment step results in conversion of at least about 50% of the metal precursor molecules, typically at least about 75%, more often at least about 90%, and most often at least about 99% of the metal precursor molecules. The heat treatment step can be carried out in any commercially available furnace capable of controlling the rate of heating, the final temperature, the dwell time, and the atmosphere. The heat-treated aerogel can either be used immediately in a smoking article or stored for future use.

The temperature of the heat treatment step can vary. The treatment temperature primarily depends on the temperature of decomposition of the precursor. Precursors of lower decomposition temperature are generally preferred. The temperature typically ranges between about 100° C. and about 600° C., more often between about 150° C. and about 450° C., and most often between about 200° C. and about 400° C. The temperature is typically greater than about 100° C., often greater than about 150° C., and most often greater than about 200° C. The temperature is typically lower than about 550° C., often lower than about 500° C., and most often lower than about 450° C.

The length of the heat treatment step can vary, but is typically between about 0.25 hour and about 8 hours, more often between about 0.5 hour and about 6 hours, and most often between about 1 hour and about 5 hours. The heat treatment step typically lasts for at least about 1 hour, more often at least about 1.5 hours, and most often at least about 2 hours.

For example, the aerogel compositions of the current invention impregnated with the metal precursor can be dried by heat treating the particles at elevated temperature (e.g., 100-150° C.) for a period of time (e.g., 1-3 hours), and then calcining to convert the metal precursor to a more catalytically active oxide form. An exemplary calcination process involves heat treatment in air at a temperature of about 500-800° C. for about 1-3 hours.

The heat treatment step occurs under an inert atmosphere, meaning an atmosphere or headspace that is substantially free of oxygen that could react with the carbon within the fuel element. Gases such as nitrogen, argon, and helium can be used.

The amount of catalytic metal compound impregnated onto the aerogel can vary. For example, the amount thereof typically applied to, or incorporated within, a representative aerogel can range from about 0.01 mg to about 100 mg, preferably about 0.1 mg to about 100 mg.

The amount of loading of the catalytic metal compound onto the aerogel can vary, but will typically be from about 0.1% to about 50% based on total dry weight of the aerogel.

Additional ways to treat the aerogel with the metal precursor can also be used. For example, the particles can be applied by spraying or coating the aerogel. The particles can be mixed with the aerogel components, i.e., during the gel formation, such that the particles are randomly or essentially homogeneously distributed within the aerogel composition. For example, a metal precursor may be dissolved in a solution and added to a colloidal solution, i.e., a gel, to form a mixture, which can then be washed and heat treated. In some embodiments, the colloidal solution is an organic gel. In another embodiment, the aerogel composition is dip-coated with a suspension of the metal precursor particles. Dip-coating can be carried out in order to provide a uniform surface coating to the aerogel.

Regarding the use of combinations of metal precursors and/or metal compounds, one exemplary combination is a combination of a metal precursor, such as cerium nitrate, with a Group VIIIB metal compound such as palladium, platinum, rhodium, or halides thereof (e.g., palladium chloride or platinum chloride). The two components can be separately applied to, or incorporated within, the aerogel. Alternatively, the two components can be added to the aerogel together, such as by addition of both components during preparation of the gel. Generally, the ratio between the amount of metal compound (e.g., Group VIIIB metal or metal halide) to the amount of metal precursor ranges from about 1:2 to about 1:10,000, on a weight basis. Typically the amount of metal compound per aerogel is between about 1 ng to about 100 mg, more often between about 10 ng to about 15 mg, most often between about 50 ng to about 1 mg.

The amount of the aerogel in a metal impregnated aerogel is typically from about 10 to about 99.9 wt. %, more typically from about 40 to about 99 wt. %, and often from about 50 to 90 wt. % based on the total weight of the total dry weight of the aerogel.

In another aspect, rather than serving as a catalyst material or as a substrate for a catalyst material, the aerogel can serve as a substrate or carrier for an aerosol-forming material and/or a flavorant such that, as air is drawn through the aerogel by the user, the aerosol-forming material or flavorant is volatilized and added to the gas flow through the aerogel. Thus, the invention further provides smoking articles that include an aerogel impregnated with at least one aerosol-forming material and a flavoring agent.

It is possible to employ a wide variety of flavoring agents or materials that alter the sensory character or nature of the drawn mainstream aerosol generated by the smoking article of the present disclosure. For example, such optional flavoring agents may be used to alter the flavor, aroma and organoleptic properties of the aerosol. Certain flavoring agents may be provided from sources other than tobacco. Exemplary flavoring agents may be natural or artificial in nature, and may be employed as concentrates or flavor packages.

Exemplary flavoring agents include vanillin, ethyl vanillin, benzaldehyde, ethyl valerate, cream, tea, coffee, fruit (e.g., apple, cherry, strawberry, peach and citrus flavors, including lime and lemon), maple, menthol, mint, peppermint, spearmint, wintergreen, nutmeg, clove, lavender, cardamom, ginger, honey, anise, sage, cinnamon, sandalwood, jasmine, cascarilla, cocoa, licorice, and flavorings and flavor packages of the type and character traditionally used for the flavoring of cigarette, cigar and pipe tobaccos. Syrups, such as high fructose corn syrup, also can be employed. Certain flavoring agents may be incorporated within aerosol-forming materials prior to formulation of a final aerosol precursor mixture (e.g., certain water soluble flavoring agents can be incorporated within water, menthol can be incorporated within propylene glycol, and certain complex flavor packages can be incorporated within propylene glycol).

The flavoring agent comprises any one or more of those conventionally used for the purpose of flavoring tobacco smoke and include organic acids, amino acids, alcohols, aldehydes, acetals, amides, amines, anhydrides, esters, ethers, pyrones, imides, ketones, lactones, phenols, pyridines, quinolones, indoles, pyrazines, dihydropyrazines, pyrroles, sulfur compounds, herbs, essential oils, extracts, hydrocarbons, or a combination thereof.

The aerosol-forming material comprises any one or more of those conventionally used for the purpose of flavoring tobacco smoke and include, without limitation, glycerin, propylene glycol, and combinations thereof.

Treating the aerogel with the flavoring agent and/or aerosol forming material can be accomplished by bringing the aerogel into intimate contact with the flavoring agent and/or aerosol forming material in a variety of ways. For example, adsorption of the flavoring agent and/or aerosol forming material can be carried out using a highly saturated solution of the flavoring agent in its solvent in the presence of the aerogel. The degree of saturation of this solution can be enhanced by the use of solvent pairs. Adsorption of the flavoring agent and/or aerosol forming material by the aerogel is also effectively accomplished by exposing the aerogel to vapors of the flavoring agent or to the pure flavoring agent and/or aerosol forming material in liquid form. The flavoring agent and aerosol forming material may contact the aerogel at the same time or sequentially. Additional conventional methods for the application flavoring agent and aerosol forming material known in the art by also be used.

The amount of either the flavoring agent and/or aerosol-forming material in the aerogel is typically from about 0.5 to about 50 wt. % based on the total weight of the aerogel, more often about 1 to about 20 wt. %.

Smoking Article

The aerogel prepared according to the invention can be utilized in a variety of smoking articles, such as any of the smoking articles set forth in U.S. Pat. No. 7,971,590 to Crooks et al. or US 2007/0215168 to Banerjee et al., which are incorporated by reference herein. Generally, the aerogel comprises from about 0.5 to about 50 wt. % of the smoking article. Referring to FIG. 1, a representative smoking article 10 in the form of a cigarette is shown. The smoking article 10 has a rod-like shape, and includes a lighting end 14 and a mouth end 18. The lighting end 14 includes a longitudinally-extending, generally cylindrical, heat generation segment 35. The heat generation segment 35 includes a heat source 40 circumscribed by insulation 42, which may be coaxially encircled by wrapping material 45. The heat source 40 preferably is configured to be activated by direct ignition of the lighting end 14. The smoking article 10 also includes a filter segment 65 located at the other end (mouth end 18), and an aerosol-generating segment 51 (which may incorporate tobacco) that is located in between those two segments.

The heat source 40 may include a combustible fuel element that has a generally cylindrical shape and can incorporate a combustible carbonaceous material. Such combustible carbonaceous materials generally have high carbon content. Preferred carbonaceous materials may be comprised predominantly of carbon, typically have carbon contents of greater than about 60 percent, generally greater than about 70 percent, often greater than about 80 percent, and frequently greater than about 90 percent, on a dry weight basis. Such combustible fuel elements can incorporate components other than combustible carbonaceous materials (e.g., tobacco components, such as powdered tobaccos or tobacco extracts; flavoring agents; salts, such as sodium chloride, potassium chloride and sodium carbonate; heat stable graphite fibers; iron oxide powder; glass filaments; powdered calcium carbonate; alumina granules; ammonia sources, such as ammonia salts; and/or binding agents, such as guar gum, ammonium alginate and sodium alginate). A representative fuel element, for example, has a length of about 12 mm and an overall outside diameter of about 4.2 mm. A representative fuel element can be extruded or compounded using a ground or powdered carbonaceous material, and has a density that is greater than about 0.5 g/cm$^3$, often greater than about 0.7 g/cm$^3$, and frequently greater than about 1 g/cm$^3$, on a dry weight basis. See, for example, the types of fuel element components, formulations and designs set forth in U.S. Pat. No. 5,551,451 to Riggs et al.; U.S. Pat. No. 7,836,897 to Borschke et al., and 5,469,871 to Barnes et al.; and US Pat. Pub. Nos. 2007/0215167 to Llewellyn Crooks et al. and 2007/0215168 to Banerjee et al.; which are incorporated herein by reference in their entirety.

Another embodiment of a fuel element 40 may include a foamed carbon monolith formed in a foam process. In another embodiment, the fuel element 40 may be co-extruded with a layer of insulation 42, thereby reducing manufacturing time and expense. Still other embodiments of fuel elements may include those of the types described in U.S. Pat. No. 4,819,665 to Roberts et al. or U.S. Pat. App. Pub. No. 2009/0044818 to Takeuchi et al., each of which is incorporated herein by reference.

A representative layer of insulation 42 can comprise glass filaments or fibers. The insulation 42 can act as a jacket that assists in maintaining the heat source 40 firmly in place within the smoking article 10. The insulation 42 can be provided as a multi-layer component including an inner layer or mat 47 of non-woven glass filaments, an intermediate layer of reconstituted tobacco paper 48, and an outer layer of non-woven glass filaments 49. These may be concentrically oriented or each overwrapping and/or circumscribing the heat source.

In one embodiment, the inner layer 47 of insulation may include a variety of glass or non-glass filaments or fibers that are woven, knit, or both woven and knit (such as, for example, so-called 3-D woven/knit hybrid mats). When woven, an inner layer 47 may be formed as a woven mat or tube. A woven or knitted mat or tube can provide improved control of air flow with regard to evenness across the insulation layer (including as any thermal-related changes may occur to the layer). Those of skill in the art will appreciate that a woven, knit, or hybrid material may provide more regular and consistent air spaces/gaps between the filaments or fibers as compared to a non-woven material which is more likely to have irregularly closed and open spaces that may provide comparatively non-uniform and/or decreased air-flow. Various other insulation embodiments may be molded, extruded, foamed, or otherwise formed. Particular embodiments of insulation structures may include those described in U.S. Pat. App. Pub. No. 2012/0042885 to Stone et al., which is incorporated by reference herein in its entirety.

Preferably, both ends of the heat generation segment 35 are open to expose at least the heat source 40 and insulation 42 at the lighting end 14. The heat source 40 and the surrounding insulation 42 can be configured so that the length of both materials is co-extensive (i.e., the ends of the insulation 42 are flush with the respective ends of the heat source 40, and particularly at the downstream end of the heat generation segment). Optionally, though not necessarily preferably, the insulation 42 may extend slightly beyond (e.g., from about 0.5 mm to about 2 mm beyond) either or both ends of the heat source 40. Moreover, heat and/or heated air produced when the lighting end 14 is ignited during use of the smoking article 10 can readily pass through the heat generation segment 35 during draw by the smoker on the mouth end 18.

The heat generation segment 35 preferably is positioned with one end disposed at the lighting end 14, and is axially aligned in an end-to-end relationship with a downstream catalyst segment 30, which in turn is also aligned in an end-to end relationship with the aerosol-generating segment 51, preferably all adjacent segments abutting one another, but with no barrier (other than open air-space) therebetween. The close proximity of the heat generation segment 35 to the lighting end 14 provides for direct ignition of the heat source/fuel element 40 of the heat generation segment 35.

The cross-sectional shape and dimensions of the heat generation segment 35, prior to burning, can vary. Preferably, the cross-sectional area of the heat source 40 makes up about 10 percent to about 35 percent, often about 15 percent to about 25 percent of the total cross-sectional area of that segment 35; while the cross-sectional area of the outer or circumscribing region (comprising the insulation 42 and relevant outer wrapping materials) makes up about 65 percent to about 90 percent, often about 75 percent to about 85 percent of the total cross-sectional area of that segment 35. For example, for a cylindrical smoking article having a circumference of about 24 mm to about 26 mm, a representative heat source 40 has a generally circular cross-sectional shape with an outer diameter of about 2.5 mm to about 5 mm, often about 3 mm to about 4.5 mm.

In one embodiment, a longitudinally extending, cylindrical catalyst segment 30 is located downstream from the heat generation segment 35. The catalyst segment 30 includes an aerogel 22 that, in certain embodiments, acts as an oxidant for the conversion of carbon monoxide to carbon dioxide present in the airflow released as the fuel element burns. As noted previously, the aerogel may optionally be impregnated with a metal compound that can convert carbon monoxide to carbon dioxide. As the fuel element burns carbon monoxide is released into the mainstream smoke, which is directed through catalyst segment 30. In certain embodiments, aerogel 22 present in the catalyst segment 30 assists in the conversion of carbon monoxide to carbon dioxide. In some embodiments, the aerogel 22 is added in an amount effective to reduce the amount of carbon monoxide to carbon dioxide in mainstream smoke.

A longitudinally extending, cylindrical aerosol-generating segment 51 is located downstream from the catalyst segment 30 and the heat generation segment 35. The aerosol-generating segment 51 includes a substrate material 55 that, in turn, acts as a carrier for an aerosol-forming agent or material (not shown). For example, the aerosol-generating segment 51 can include a reconstituted tobacco material that includes processing aids, flavoring agents, and glycerin.

In another embodiment, the substrate material 55 may be an aerogel composition as noted herein, which can be coated with at least one aerosol-generating material and/or a flavoring agent. The foregoing components of the aerosol-generating segment 51 can be disposed within, and circumscribed by, a wrapping material 58. The wrapping material 58 can be configured to facilitate the transfer of heat from the lighting end 14 of the smoking article 10 (e.g., from the heat generation segment 35) to the catalyst segment if present and to the components of the aerosol-generating segment 51. That is, the aerosol-generating segment 51, the catalyst segment 30 if present, and the heat generation segment 35 can be configured in a heat exchange relationship with one another. The heat exchange relationship is such that sufficient heat from the heat source 40 is supplied through the catalyst segment 30 if present to the aerosol-formation region to volatilize aerosol-forming material for aerosol formation. In some embodiments, the heat exchange relationship is achieved by positioning all those segments in close proximity to one another. A heat exchange relationship also can be achieved by extending a heat conductive material from the vicinity of the heat source 40 into or around the region occupied by the catalyst segment 30 if present and the aerosol-generating segment 51. Particular embodiments of substrates may include those described below or those described in U.S. Pat. App. Pub. No. 2012/0042885 to Stone et al., which is incorporated by reference herein in its entirety.

A representative wrapping material 58 for the substrate material 55 may include heat conductive properties to conduct heat from the heat generation segment 35 via the catalyst segment 30 if present to the aerosol-generating segment 51, in order to provide for the volatilization of the aerosol forming components contained therein. The substrate material 55 may be about 10 mm to about 22 mm in length, with certain embodiments being about 11 mm up to about 21 mm. The substrate material 55 can be provided from a blend of flavorful and aromatic tobaccos in cut filler form or can be provided as an aerogel. Those tobaccos and aerogels, in turn, can be treated with aerosol-forming material and/or at least one flavoring agent. When the substrate material 55 comprises tobacco, the tobacco can be provided from a processed tobacco (e.g., a reconstituted tobacco manufactured using cast sheet or papermaking types of processes) in cut filler form. Certain cast sheet constructions may include about 270 to about 300 mg of tobacco per 10 mm of linear length. That tobacco, in turn, can be treated with, or processed to incorporate, aerosol-forming material and/or at least one flavoring agent, as well as a burn retardant (e.g., diammonium phosphate or another salt) configured to help prevent ignition and/or scorching by the heat-generation segment. If the substrate material 55 is an aerogel, such composition can also be treated with, or processed to incorporate, aerosol-forming material and/or at least one flavoring agent as well. In some embodiments, the aerogel is a porous monolith, which can be treated with, or processed to incorporate, aerosol-forming material and/or at least one flavoring agent. In some embodiments, the aerogel is a plurality of particles dispersed throughout the tobacco, which can also be treated with, or processed to incorporate, aerosol-forming material and/or at least one flavoring agent. In some embodiments, the aerogel is also a plurality of particles dispersed throughout the tobacco, which can optionally be impregnated with a catalytic metal compound.

A metal inner surface of the wrapping material 58 of the aerosol-generating segment 51 can act as a carrier for aerosol-forming material and/or at least one flavoring agent.

In other embodiments, the substrate 55 may include a tobacco paper or non-tobacco gathered paper formed as a plug section. The plug section may be loaded with aerosol-forming materials, flavorants, tobacco extracts, or the like in a variety of forms (e.g., microencapsulated, liquid, powdered). A burn retardant (e.g., diammonium phosphate or another salt) may be applied to at least a distal/lighting-end portion of the substrate to help prevent ignition and/or scorching by the heat-generation segment. In these and/or other embodiments, the substrate 55 may include pellets or beads formed from marumarized and/or non-marumarized tobacco. Marumarized tobacco is known, for example, from U.S. Pat. No. 5,105,831 to Banerjee, et al., which is incorporated herein by reference. Marumarized tobacco may include about 20 to about 50 percent (by weight) tobacco blend in powder form, with glycerol (at about 20 to about 30 percent by weight), calcium carbonate (generally at about 10 to about 60 percent by weight, often at about 40 to about 60 percent by weight), along with binder and flavoring agents. The binder may include, for example, a carboxymethyl cellulose (CMC), gum (e.g., guar gum), xanthan, pullulan, and/or an alginate. The beads, pellets, or other marumarized forms may be constructed in dimensions appropriate to fitting within a substrate section and providing for optimal air flow and production of desirable aerosol. A container, such as a cavity or capsule, may be formed for retaining the substrate in place within the smoking article. Such a container may be beneficial to contain, for example, pellets or beads of marumarized and/or non-marumarized tobacco. The container may be formed using wrapping materials as further described below. The term "tobacco pellets" is defined herein to include beads, pellets, or other discrete small units of tobacco that may include marumarized and/or non-marumarized tobacco. The tobacco pellets may have smooth, regular outer shapes (e.g., spheres, cylinders, ovoids, etc.) and/or they may have irregular outer shapes. In one example, the diameter of each tobacco pellet may range from less than about 1 mm to about 2 mm. The tobacco pellets may at least partially fill a substrate cavity of a smoking article as described herein. In one example, the volume of the substrate cavity may range from about 500 mm$^3$ to about 700 mm$^3$ (e.g., a substrate cavity of a smoking article where the cavity diameter is about 7.5 to about 7.8 mm, and the cavity length is about 11 to about 15 mm, with the cavity having a generally cylindrical geometry). In one example, the mass of the tobacco pellets within the substrate cavity may range from about 200 mg to about 500 mg.

In still other embodiments, the substrate 55 may be configured as a monolithic substrate, formed, for example, as described in U.S. Pat. App. Pub. No. 2012/0042885 to Stone et al., which is incorporated herein by reference in its entirety. The substrate may include or be constructed from an extruded material. The substrate also may be formed by press-fit or molding/casting and convective heat transfer) from the heat source 40 to the adjacent catalyst segment 30 followed by substrate material 55, throughout the time that the heat source is activated (e.g., burned) during use of the smoking article 10.

A buffer region 53 may reduce potential scorching or other thermal degradation of portions of the catalyst segment 30 if present. The buffer region 53 may mainly include empty air space, or it may be partially or substantially completely filled with a non-combustible material such as, for example, metal, organic, inorganic, ceramic, or polymeric materials, or any combination thereof. The buffer regions may be from about 1 mm to about 10 mm or more in thickness (length), but often will be about 2 mm to about 5 mm in thickness (length).

The components of the aerosol-generation system 60 preferably are attached to one another, and secured in place using an overwrap material 64. For example, the overwrap material 64 can include a paper wrapping material or a laminated paper-type material that circumscribes each of the heat generation segment 35, and the catalyst segment 30 if present, and at least a portion of outer longitudinally extending surface of the aerosol-generating segment 51. The inner surface of the overwrap material 64 may be secured to the outer surfaces of the components it circumscribes by a suitable adhesive.

The smoking article 10 preferably includes a suitable mouthpiece such as, for example, a filter element 65, positioned at the mouth end 18 thereof. The filter element 65 preferably is positioned at one end of the cigarette rod adjacent to one end of the aerosol-generating segment 51, such that the filter element 65 and the aerosol-generating segment 51 are axially aligned in an end-to-end relationship, abutting one another but without any barrier therebetween. Preferably, the general cross-sectional shapes and dimensions of those segments 51 and 65 are essentially identical to one another when viewed transversely to the longitudinal axis of the smoking article. The filter element 65 may include filter material 70 that is overwrapped along the longitudinally extending surface thereof with circumscribing plug wrap material 72.

In one example, the filter material 70 includes plasticized cellulose acetate tow, while in some examples the filter material may include an aerogel as described herein, either in the form of a monolith or as a particulate material. As the fuel element burns carbon monoxide is released into mainstream smoke, which is directed through the filter. Aerogel present in the filter can adsorb gaseous components of mainstream smoke during use of the smoking article and, in certain embodiments where the aerogel includes a catalytic metal, can catalyze certain reactions involving components of mainstream smoke such as carbon monoxide. Both ends of the filter element 65 preferably are open to permit the passage of aerosol therethrough. The aerosol-generating system 60 preferably is attached to the filter element 65 using tipping material 78. The filter element 65 may also include a crushable flavor capsule of the type described in U.S. Pat. No. 7,479,098 to Thomas et al. and U.S. Pat. No. 7,793,665 to Dube et al.; and U.S. Pat. No. 8,186,359 to Ademe et al., which are incorporated herein by reference in their entirety.

The smoking article 10 may include an air dilution means, such as a series of perforations 81, each of which may extend through the filter element tipping material 78 and plug wrap material 72 in the manner shown, and/or which may extend to or into the substrate 55.

The overall dimensions of the smoking article 10, prior to burning, can vary. Typically, smoking articles 10 are cylindrically shaped rods having circumferences of about 20 mm to about 27 mm, have overall lengths of about 70 mm to about 130 mm—often about 83 mm to about 100 mm. Smokable lighting end segments 22 typically have lengths of about 3 mm to about 15 mm, but can be up to about 30 mm. The aerosol-generation system 60 has an overall length that can vary from about 20 mm to about 65 mm. The heat generation segment 35 of the aerosol-generation system 60 may have a length of about 5 mm to about 30 mm; the catalyst segment 30 of the aerosol-generation system 60 may have a length of about 1 mm to about 30 mm; and the aerosol-generating segment 51 of the aerosol-generation system 60 may have an overall length of about 10 mm to about 60 mm.

The combined amount of aerosol-forming agent and substrate material 55 employed in the aerosol-generating segment 51 can vary. The material preferably may be employed so as to fill the appropriate section of the aerosol-generating segment 51 (e.g., the region within the wrapping material 58 thereof) at a packing density of about 100 to about 400 $mg/cm^3$.

During use, the smoker lights the lighting end 14 of the smoking article 10 using a match or cigarette lighter, in a manner similar to the way that conventional smoking articles are lit, such that the heat source/fuel element 40 at the lighting end 14 is ignited. The mouth end 18 of the smoking article 10 is placed in the lips of the smoker. Thermal decomposition products (e.g., components of tobacco smoke) generated by the aerosol generation system 60 are drawn through. Thus, the generic term "monolithic substrate" may include a substrate formed by extrusion or by one of those other methods.

In some preferred smoking articles, both ends of the aerosol-generating segment 51 are open to expose the substrate material 55 thereof. Together, the heat generating segment 35, the catalyst segment 30 if present, and the aerosol-generating segment 51 form an aerosol-generation system 60. The aerosol-generating segment 51 is positioned adjacent to the downstream end of the catalyst segment 30, which in turn is positioned adjacent to the downstream end of the heat generation segment 35 such that those segments 51, 30, and 35 are axially all aligned in an end-to-end relationship. Those segments can abut one another, or be positioned in a slightly spaced apart relationship, which may include a buffer region 53. The outer cross-sectional shapes and dimensions of those segments, when viewed transversely to the longitudinal axis of the smoking article 10, can be essentially identical to one another. The physical arrangement of those components preferably is such that heat is transferred (e.g., by means that includes conductive and convective heat transfer) from the heat source 40 to the adjacent material 30 if present and/or substrate material 55, throughout the time that the heat source is activated (e.g., burned) during use of the smoking article 10.

Direct ignition actuates the fuel element 40 of the heat generation segment 35 such that it preferably will be ignited or otherwise activated (e.g., begin to burn). The heat source 40 within the aerosol-generation system 60 will burn, and provide heat to volatilize aerosol-forming material within the aerosol-generating segment 51 as a result of the heat exchange relationship between those two segments. Certain preferred heat sources 40 will not experience volumetric decrease during activation, while others may degrade in a manner that reduces their volume. Preferably, the components of the aerosol-generating segment 51 do not experience thermal decomposition (e.g., charring or burning) to any significant degree. Volatilized components are entrained in the air that is drawn through the aerosol-generating region 51. The aerosol so formed will be drawn through the filter element 65, and into the mouth of the smoker.

During certain periods of use, aerosol formed within the aerosol-generating segment 51 will be drawn through the filter element 65 and into the mouth of the smoker. Thus, the mainstream aerosol produced by the smoking article 10 includes tobacco smoke produced by the volatilized aerosol-forming material.

As previously disclosed, the filter element 65 preferably is attached to the cigarette rod so formed using a tipping material 78. The smoking article optionally can be air-diluted by providing appropriate perforations 81 in the vicinity of the mouth end region 18, as is known in the art. Filters may include materials and may be manufactured by methods such as, for example, those disclosed in U.S. Pat. No. 7,740,019 to Nelson et al., U.S. Pat. No. 7,972,254 to Stokes et al., U.S. Pat. No. 8,375,958 to Hutchens et al.; and U.S. Pat. Publ. Nos. 2008/0142028 to Fagg, et al.; and 2009/0090372 to Thomas et al., each of which is incorporated herein by reference.

Flavor may be provided or enhanced by capsule or microcapsule materials on or within the substrate material 55 of the aerosol-generating segment 51, the wrapping materials, the filter element 65, or any other component capable of holding and releasing flavorants, preferably with minimal thermal degradation that would undesirably alter the flavor. Other flavor components associated with a filter may also be used; see, for example, U.S. Pat. No. 5,724,997 to Fagg, et al.

Cigarettes described with reference to FIG. 1 may be used in much the same manner as those cigarettes commercially marketed under the trade name "Eclipse" by R. J. Reynolds Tobacco Company. See also the "Steam Hot One" cigarette marketed by Japan Tobacco Inc.

Fuel elements of the heat generation segment may vary. Suitable fuel elements, and representative components, designs and configurations thereof, and manners and methods for producing those fuel elements and the components thereof, are set forth in U.S. Pat. No. 4,714,082 to Banerjee et al.; U.S. Pat. No. 4,756,318 to Clearman et al.; U.S. Pat. No. 4,881,556 to Clearman et al.; U.S. Pat. No. 4,989,619 to Clearman et al.; U.S. Pat. No. 5,020,548 to Farrier et al.; U.S. Pat. No. 5,027,837 to Clearman et al.; U.S. Pat. No. 5,067,499 to Banerjee et al.; U.S. Pat. No. 5,076,297 to Farrier et al.; U.S. Pat. No. 5,099,861 to Clearman et al.; U.S. Pat. No. 5,105,831 to Banerjee et al.; U.S. Pat. No. 5,129,409 to White et al.; U.S. Pat. No. 5,148,821 to Best et al.; U.S. Pat. No. 5,156,170 to Clearman et al.; U.S. Pat. No. 5,178,167 to Riggs et al.; U.S. Pat. No. 5,211,684 to Shannon et al.; U.S. Pat. No. 5,247,947 to Clearman et al.; U.S. Pat. No. 5,345,955 to Clearman et al.; U.S. Pat. No. 5,469,871 to Barnes et al.; U.S. Pat. No. 5,551,451 to Riggs; U.S. Pat. No. 5,560,376 to Meiring et al.; U.S. Pat. No. 5,706,834 to Meiring et al.; U.S. Pat. No. 5,727,571 to Meiring et al.; U.S. Pat. No. 8,469,035 to Banerjee et al.; and U.S. Pat. App. Pub. Nos. 2005/0274390 to Banerjee et al.; and 2013/0269720 to Stone et al.; which are incorporated herein by reference.

Fuel elements often comprise carbonaceous material and may include ingredients such as graphite or alumina, as well as high carbon content carbonaceous material. Carbonaceous fuel elements include the type that have been incorporated within those cigarettes commercially marketed under the trade names "Premier" and "Eclipse" by R. J. Reynolds Tobacco Company. See also the "Steam Hot One" cigarette marketed by Japan Tobacco Inc. Some other embodiments of fuel elements are set forth in U.S. Pat. No. 5,178,167 to Riggs et al. and U.S. Pat. No. 5,551,451 to Riggs et al., both which are incorporated herein by reference in their entirety, but certain embodiments may lack the sodium, graphite, and/or calcium carbonate set forth therein. Some fuel element embodiments may include a foamed carbon monolith. In another embodiment, the fuel element 40 may be co-extruded with a layer of insulation 42, thereby reducing manufacturing time and expense.

The fuel element preferably will be circumscribed or otherwise jacketed by insulation, or other suitable material. The insulation can be configured and employed so as to support, maintain and retain the fuel element in place within the smoking article. The insulation may additionally be configured such that drawn air and aerosol can pass readily therethrough. Examples of insulation materials, components of insulation assemblies, configurations of representative insulation assemblies within heat generation segments, wrapping materials for insulation assemblies, and manners and methods for producing those components and assemblies, are set forth in U.S. Pat. No. 4,807,809 to Pryor et al.; U.S. Pat. No. 4,893,637 to Hancock et al.; U.S. Pat. No. 4,938,238 to Barnes et al.; U.S. Pat. No. 5,027,836 to Shannon et al.; U.S. Pat. No. 5,065,776 to Lawson et al.; U.S. Pat. No. 5,105,838 to White et al.; U.S. Pat. No. 5,247,947 to Clearman et al.; U.S. Pat. No. 5,303,720 to Banerjee et al.; U.S. Pat. No. 5,345,955 to Clearman et al.; U.S. Pat. No. 5,396,911 to Casey, III et al.; U.S. Pat. No. 5,546,965 to White; U.S. Pat. No. 5,727,571 to Meiring et al.; U.S. Pat. No. 5,902,431 to Wilkinson et al.; U.S. Pat. No. 5,944,025 to Cook et al.; U.S. Pat. No. 8,424,538 to Thomas et al.; and U.S. Pat. No. 8,464,726 to Sebastian et al.; which are incorporated herein by reference. Insulation assemblies have been incorporated within the types of cigarettes commercially marketed under the trade names "Premier" and "Eclipse" by R. J. Reynolds Tobacco Company, and as "Steam Hot One" cigarette marketed by Japan Tobacco Inc.

Flame/burn retardant materials and additives useful in insulation may include silica, carbon, ceramic, metallic fibers and/or particles. When treating cellulosic or other fibers such as—for example—cotton, boric acid or various organophosphate compounds may provide desirable flame-retardant properties. In addition, various organic or metallic nanoparticles may confer a desired property of flame-retardancy, as may diammonium phosphate and/or other salts. Other useful materials may include organo-phosphorus compounds, borax, hydrated alumina, graphite, potassium tripolyphosphate, dipentaerythritol, pentaerythritol, and polyols. Others such as nitrogenous phosphonic acid salts, mono-ammonium phosphate, ammonium polyphosphate, ammonium bromide, ammonium chloride, ammonium borate, ethanolammonium borate, ammonium sulphamate, halogenated organic compounds, thio-urea, and antimony oxides may be used but are not preferred agents. In each embodiment of flame-retardant, burn-retardant, and/or scorch-retardant materials used in insulation, substrate material and other components (whether alone or in any combination with each other and/or other materials), the desirable properties most preferably are provided without undesirable off-gassing or melting-type behavior.

An insulation fabric preferably will have sufficient oxygen diffusion capability to sustain a smoking article such as a cigarette in a lit condition during a desired usage time. Accordingly the insulation fabric preferably will be porous by virtue of its construction. In knit, woven, or combined woven and knit constructions, the required porosity may be controlled by configuring the assembly machinery to leave sufficient (desirably sized) gaps between fibers to allow for oxygen diffusion into the heat source. For non-woven fabrics, which may not be porous enough to promote evenly sustained combustion, additional porosity may be achieved by perforations into the insulation by methods known in the art including, for example, hot or cold pin perforation, flame perforation, embossing, laser cutting, drilling, blade cutting, chemical perforation, punching, and other methods. Each of the buffer and the insulation may include non-glass material that is woven, knit, or a combination thereof, a foamed metal material, a foamed ceramic material, a foamed ceramic metal composite, and any combination thereof, and the material in the insulation may be the same as or different than that in the buffer.

The aerosol-forming material can vary, and mixtures of various aerosol-forming materials can be used, as can various combinations and varieties of flavoring agents (including various materials that alter the sensory and/or organoleptic character or nature of mainstream aerosol of a smoking article), wrapping materials, mouth-end pieces, filter elements, plug wrap, and tipping material. Representative types of these components are set forth in U.S. Pat. App. Pub. No. 2007/0215167 to Llewellyn Crooks, et al., which is incorporated herein by reference in its entirety.

The substrate material can incorporate tobacco of some form, and can be provided by virtually all tobacco material. The substrate material can incorporate an aerogel, which may be an aerogel monolith or may be particles dispersed throughout any tobacco containing composition. The form of the substrate material can vary. In some embodiments, the substrate material is employed in an essentially traditional filler form (e.g., as cut filler). The substrate material can be otherwise formed into desired configurations (see, e.g., U.S. Pat. Pub. No. 2011/0271971 to Conner et al., which is incorporated herein by reference). The substrate material can be used in the form of a gathered web or sheet, using the types of techniques generally set forth in U.S. Pat. No. 4,807,809 to Pryor et al, which is incorporated herein by reference in its entirety. The substrate material can be used in the form of a web or sheet that is shredded into a plurality of longitudinally extending strands, using the types of techniques generally set forth in U.S. Pat. No. 5,025,814 to Raker, which is incorporated herein by reference in its entirety. The substrate material can have the form of a loosely rolled sheet, such that a spiral type of air passageway extends longitudinally through the aerosol-generating segment. Representative types of tobacco containing substrate materials can be manufactured from mixtures of tobacco types; or from one predominant type of tobacco (e.g., a cast sheet-type or paper-type reconstituted tobacco composed primarily of burley tobacco, or a cast sheet-type or paper-type reconstituted tobacco composed primarily of Oriental tobacco).

The substrate material also can be treated with tobacco additives of the type that are traditionally used for the manufacture of cigarettes, such as casing and/or top dressing components. See, for example, the types of components set forth in U.S. Pat. Publication 2004/0173229 to Crooks et al., which is incorporated herein by reference in its entirety.

The manner by which the aerosol-forming material is contacted with the substrate material can vary. The aerosol-forming material can be applied to a formed tobacco material, or can be incorporated into processed tobacco materials during manufacture of those materials. The aerosol-forming material can be dissolved or dispersed in an aqueous liquid, or other suitable solvent or liquid carrier, and sprayed onto that substrate material. See, for example, U.S. Patent Application Pub. No. 2005/0066986 to Nestor et al, which is incorporated herein by reference in its entirety. The amount of aerosol-forming material employed relative to the dry weight of substrate material can vary. Materials including exceedingly high levels of aerosol-forming material can be difficult to process into cigarette rods using conventional types of automated cigarette manufacturing equipment.

The mainstream aerosol produced by the smoking article 10 includes tobacco smoke produced by the volatilized aerosol-forming material in aerosol-generating segment 51. For every puff most of the mainstream aerosol that is provided is produced by the aerosol-generation system 60. The smoker can smoke a smoking article for a desired number of puffs. However, when the smokable material 55 has been consumed, and the heat source 40 extinguishes, the use of the smoking article is ceased (i.e., the smoking experience is finished).

Typically, the lighting end segment can be manufactured by providing a "two-up" lighting end segment, aligning a heat source segment at each end of the "two-up" segment, and wrapping the aligned components to provide a "two-up" combined segment. That "two-up" combined segment then is cut in half perpendicular to its longitudinal axis to provide two combined segments. Alternatively, two segments can be aligned and wrapped to provide a combined segment.

Typically, the mouth end segment can be provided by connecting the aerosol-generating segment to each end of the "two-up" filter element segment to provide a "two-up" combined segment; and subdividing the "two-up" combined segment to provide two combined mouth end segments. Alternatively, that combined segment can be provided by connecting a filter element segment to each end of a "two-up" aerosol-generating segment to provide a "two-up" combined segment; and subdividing the "two-up" combined segment to provide two combined mouth end segments.

Smokable lighting end segments, heat generation segments, the aerosol-generating segments, tobacco-containing segments, mouth end pieces, and various components of the foregoing, can be manufactured using conventional types of cigarette and cigarette component manufacturing techniques and equipment, or appropriately modified cigarette and cigarette component manufacturing equipment. That is, the various component parts and pieces can be processed and assembled into cigarettes using the conventional types of technologies known to those skilled in the art of the design and manufacture of cigarettes and cigarette components, and in the art of cigarette component assembly. See, for example, the types of component configurations, component materials, assembly methodologies and assembly technologies set forth in U.S. Pat. No. 5,052,413 to Baker et al.; U.S. Pat. No. 5,088,507 to Baker et al.; U.S. Pat. No. 5,105,838 to White et al.; U.S. Pat. No. 5,469,871 to Barnes et al.; and U.S. Pat. No. 5,551,451 to Riggs et al.; and US Pat. Publication No. 2005/0066986 to Nestor et al., which are incorporated herein by reference in their entireties.

The manufacture of multi-segment components can be carried out using combination equipment of the type available under the brand name Mulfi or Merlin from Hauni Maschinenbau AG of Hamburg, Germany; or as LKF-01 Laboratory Multi Filter Maker from Heinrich Burghart GmbH. Combination of various segments or cigarette components also can be carried out using conventional-type or suitably modified devices, such as tipping devices available as Lab MAX, MAX, MAX S or MAX 80 banding devices from Hauni Maschinenbau AG. That is, rods, segments and combined segments can be fed (e.g., using trays, hoppers, wheels, and the like), aligned, tipped or otherwise connected, subdivided, turned, conveyed, separated and collected (e.g., using trays, belts, hoppers, and the like) using appropriately modified and arranged tipping devices. See, for example, the types of devices and combination techniques set forth in U.S. Pat. No. 3,308,600 to Erdmann et al.;

U.S. Pat. No. 4,280,187 to Reuland et al.; U.S. Pat. No. 4,281,670 to Heitmann et al.; and U.S. Pat. No. 6,229,115 to Vos et al.; and US Pat. Publication. No. 2005/0194014 to Read, Jr.

The types of materials and configurations utilized for smokable materials, insulation materials, aerosol-forming materials, flavoring agents, wrapping materials, mouth end pieces (e.g., filter elements), plug wraps, and tipping materials in the smoking articles of the invention can vary. Embodiments of such smoking article components are set forth in US 2007/02015167 to Crooks et al. and US 2007/0215168 to Banerjee et al.

For cigarettes of the present invention that are air-diluted or ventilated, the amount or degree of air dilution or ventilation can vary. Frequently, the amount of air dilution for an air diluted cigarette is greater than about 10 percent, generally is greater than about 20 percent, often is greater than about 30 percent, and sometimes is greater than about 40 percent. In some embodiments, the upper level for air dilution for an air-diluted cigarette is less than about 80 percent, and often is less than about 70 percent. As used herein, the term "air dilution" is the ratio (expressed as a percentage) of the volume of air drawn through the air dilution means to the total volume of air and aerosol drawn through the cigarette and exiting the mouth end portion of the cigarette. Higher air dilution levels can act to reduce the transfer efficiency of aerosol-forming material into mainstream aerosol.

In some embodiments, cigarettes of the present invention exhibit desirable resistance to draw. For example, an exemplary cigarette exhibits a pressure drop of between about 50 and about 200 mm water pressure drop at 17.5 cc/sec. air flow. Preferred cigarettes exhibit pressure drop values of between about 60 mm and about 180 mm, and, in some embodiments, between about 70 mm to about 150 mm, water pressure drop at 17.5 cc/sec. air flow. Pressure drop values of cigarettes are measured using a Filtrona Cigarette Test Station (CTS Series) available form Filtrona Instruments and Automation Ltd.

Preferred embodiments of cigarettes of the present invention, when smoked, yield an acceptable number of puffs. Such cigarettes normally provide more than about 6 puffs, and generally more than about 8 puffs, per cigarette, when machine smoked under FTC smoking conditions. Such cigarettes normally provide less than about 15 puffs, and generally less than about 12 puffs, per cigarette, when smoked under FTC of more than about 5. A cigarette (e.g., a cigarette including a carbonaceous fuel element absent of a centrally or internally located longitudinally extending air passageway) exhibits a ratio of yield of FTC carbon monoxide to FTC "tar" of less than about 1, often less than about 0.8, and frequently less than about 0.6. Techniques for determining FTC "tar" and FTC nicotine are set forth in Pillsbury et al., J. Assoc. Off. Anal. Chem., 52, 458-462 (1969). Techniques for determining FTC carbon monoxide are set forth in Horton et al., J. Assoc. Off. Anal. Chem., 57, 1-7 (1974).

Aerosols that are produced by cigarettes of the present invention are those that comprise air-containing components such as vapors, gases, suspended particulates, and the like. Aerosol components can be generated by vaporizing aerosol-forming agent. As such, the aerosol can contain volatilized components, combustion products (e.g., carbon dioxide and water), and incomplete combustion products, and products of pyrolysis. Aerosol components may also be generated by the action of heat from burning tobacco of some form (and optionally other components that are burned to generate heat), upon substances that are located in a heat exchange relationship with tobacco material that is burned and other components that are burned. Aerosol components may also be generated by the aerosol-generation system as a result of the action of the heat generation segment upon an aerosol-generating segment. In some embodiments, components of the aerosol-generating segment have an overall composition, and are positioned within the smoking article, such that those components have a tendency not to undergo a significant degree of thermal decomposition (e.g., as a result of combustion, smoldering or pyrolysis) during conditions of normal use.

Smoking articles of the present invention can be packaged for distribution, sale and use. Cigarettes can be packaged in the manner used for those cigarettes commercially marketed under the trade names "Premier" and "Eclipse" by R. J. Reynolds Tobacco Company. Cigarettes also can be packaged in the manner used for those cigarettes commercially marketed under the trade name Camel Blackjack Gin by R. J. Reynolds Tobacco Company. Cigarettes also can be packaged in the manner used for those cigarettes commercially marketed under the trade name Salem Dark Currents Silver Label by R. J. Reynolds Tobacco Company. See, also, the types of packages set forth in U.S. Pat. No. 4,715,497 to Focke et al.; U.S. Pat. No. 4,294,353 to Focke et al.; U.S. Pat. No. 4,534,463 to Bouchard; U.S. Pat. No. 4,852,734 to Allen et al.; U.S. Pat. No. 5,139,140 to Burrows et al.; and U.S. Pat. No. 5,938,018 to Keaveney et al.; UK Pat. Spec. 1,042,000; German Pat. App. DE 10238906 to Marx; and US Pat. Publication Nos. 2004/0217023 to Fagg et al.; 2004/0256253 to Henson et al.; and 2005/0150786 to Mitten et al.

EXAMPLES

Example 1: Exemplary Preparation of a Carbon Aerogel

Step 1: Gel Preparation

A catalyst solution is prepared by dissolving 0.20 g of $Na_2CO_3$ in 100 g of water. In a separate container, 1.00 grams of resorcinol is dissolved in 47.1 g of water. To this solution, 47 g of a formaldehyde solution is added followed by 2.41 g of the prepared catalyst solution. The reaction mixture is sealed and stirred for 24 h. After 24 h, the reaction mixture is transferred into an oven at 80° C. The gel sets within a few hours to a day, and is left in the oven for about 3 days.

Step 2: Gel Processing Conditions

The gel is removed and solvent exchange into acetone, methanol, or isopropanol over the course of 3-5 days is done, exchanging the solvent at least once a day. The gel is placed in a supercritical dryer. Exchange into liquid $CO_2$ over the course of 2-3 days is performed. The procedure heated the $CO_2$ through its critical point (31.1° C. and 72.9 bars) to ~45° C. while maintaining a pressure of ~100 bars and depressurized at a rate of ~7 bar per hour.

Step 3: Pyrolysis Method

The organic aerogel from Step 2 is heated at high temperature in a high-temperature (1100° C. max) tube furnace, such as a Lindberg Blue/M™ Mini-Mite™, using a fused quartz process tube. The end caps used connected the gas tank to the quartz tube and also connected the other end of the quartz tube to an exhaust line. Alternatively, the gel can be heated in a high-temperature box furnace or oven equipped with a thermometer, a ceramic crucible, and a pipe fitting to adapt the gas tank output to the furnace input as well as the exhaust line out of the furnace.

The aerogel is placed into the center of the quartz tube or crucible. If a tube furnace is used, the quartz tube is placed in the center of the tube furnace such that the aerogel is halfway along the heated length. If using a box furnace, the crucible is placed in the center of the furnace where possible. The nitrogen or argon line is connected. If a quartz tube is used, the end cap is secured and the gas tank is connected to one end of the tube. If a box furnace is used, the gas supply line is attached to a suitable, sealed fitting (such as a barb-to-NPT adapter) attached to the furnace. An exhaust line is connected to the system and routed into a suitable vent such as an exhaust duct or a chemical fume hood. The gas tank is opened. The regulator is opened to allow gas to flow. A suitable flow rate for a 1" quartz tube is 200 sccm (standard cubic centimeters per minute) of gas. If a mass flow meter is not used, only a few few psi should be used to generate a relatively gentle flow. The furnace temperature is set between 600 and 1050° C. (although temperatures of 400-1800° C. works). The temperature set determines the degree of pyrolyzation (for organic aerogels, the degree of carbonization and/or graphitization). Once at temperature, the aerogel is allowed to pyrolyze for 3-10 h. It should be noted that if the system takes a long time to ramp to its temperature set point, this ramp up time should be factored into the total pyrolysis time. A fast-heating furnace like a Mini-Mite™ takes minutes to reach temperature and requires longer soak times at the set point than a large box furnace that takes 1-3 hours to ramp (since the aerogel will be above pyrolyzable temperatures during much of the ramp phase). The furnace is turned off and cooled to ~200° C. or less before opening. The gas tank is turned off.

Example 2: Preparation of a Carbon Aerogel

A carbon aerogel was prepared according to the general procedure set forth in Example 1, except, in Step 2, the gel was placed in isopropanol and exchanged 5 times. Also, supercritical drying was conducted in a supercritical extractor as described below. The supercritical $CO_2$ drying method was conducted on a Jasco supercritical fluid extractor over a course of three days. The aerogel starting material was placed in a stainless steel column and heated in the column oven to 32° C. To dry the aerogel starting material, three consecutive 999 min runs were done at a constant temperature and pressure of 32° C. and 10 MPa using 100% $CO_2$ as the drying solvent. Upon completion of the three runs, a depressurization method was run at 0.7 MPa/hr with a constant temperature of 32° C. and 100% $CO_2$. FIG. 2 is a photograph of the aerogel following supercritical drying. The aerogel at this stage is extremely light and has a cranberry red color.

Supercritically dried aerogel was placed in a quartz tube and inserted into a furnace under nitrogen gas. Sample was heated to 800° C. for 3 hours and allowed to cool overnight under nitrogen gas. FIG. 3 is a photograph of the aerogel following pyrolysis. The aerogel is extremely light and carbon-black. Product development could use carbon aerogel technology in applications including insulation, matrix support for harm reduction technology (i.e. catalysts), filtration (activated carbon) and for specific e-cigarette uses.

That which is claimed:
1. A smoking article comprising:
   a lighting end and a mouth end distal from the lighting end, the lighting end comprising a heat generation segment, wherein the heat generation segment includes a fuel element, and the mouth end comprising a filter element;
   an aerosol-generation segment positioned downstream of the heat generation segment, wherein the aerosol-generation segment comprises processed tobacco treated with one or both of an aerosol-forming material and a flavoring agent, and a plurality of pyrolyzed resorcinol-formaldehyde aerogel particles dispersed throughout the tobacco, the particles impregnated with a catalytic metal compound for conversion of carbon monoxide to carbon dioxide;
   a wrapping material configured for heat transfer and comprising a metal, inner surface, the wrapping material circumscribing the heat generation segment and the aerosol-generation segment, wherein the wrapping material is effective to transfer heat from the heat generation segment to the aerosol-generation segment; and
   tipping paper circumscribing the filter element and at least a portion of the aerosol generation segment;
   wherein each segment is physically separate and in a heat exchange relationship.
2. The smoking article of claim 1, wherein the aerosol-forming material is glycerin, propylene glycol, or a combination thereof.
3. The smoking article of claim 1, wherein the loading of the catalytic metal compound on the pyrolyzed resorcinol-formaldehyde aerogel is from about 0.1% to about 50%, based on the total dry weight of the pyrolyzed resorcinol-formaldehyde aerogel.
4. The smoking article of claim 1, wherein the catalytic metal compound comprises a metal selected from the group consisting of alkali metals, alkaline earth metals, transition metals in Groups IIIB, IVB, VB, VIB VIIB, VIIIB, IB, and IIB, Group IIIA elements, Group IVA elements, lanthanides, actinides and combinations thereof.
5. The smoking article of claim 1, wherein the catalytic metal compound comprises a metal selected from the group consisting of Ti, Zr, Hf, V, Nb, Ta, Cr, Mo, W, Mn, Re, Fe, Co, Ni, Ru, Rh, Pd, Os, Ir, Cu, Ag, Au, Zn, Y, Ce, Na, K, Cs, Mg, Ca, B, Al, Si, Ge, Sn, and combinations thereof.
6. The smoking article of claim 1, wherein the catalytic metal compound comprises a metal selected from the group consisting of iron, copper, zinc, cerium, silver and combinations thereof.
7. The smoking article of claim 1, wherein the pyrolyzed resorcinol-formaldehyde aerogel comprises a bulk density ranging from about 0.5 to about 0.01 $g/cm^3$.
8. The smoking article of claim 1, wherein the pyrolyzed resorcinol-formaldehyde aerogel comprises a surface area ranging from about 100 to about 1000 $m^2/g$.
9. The smoking article of claim 1, wherein the pyrolyzed resorcinol-formaldehyde aerogel is mesoporous.
10. The smoking article of claim 1, wherein the pyrolyzed resorcinol-formaldehyde aerogel comprises spherical particles of an average particle size range of about 1 μm to about 250 μm.
11. The smoking article of claim 1, wherein the pyrolyzed resorcinol-formaldehyde aerogel comprises from about 0.5 to about 50 wt. % of the smoking article.
12. The smoking article of claim 1, wherein the mouth end comprises a filter including a plurality of pyrolyzed resorcinol-formaldehyde aerogel particles dispersed in the filter.
13. The smoking article of claim 1, further comprising an air dilution means comprising a series of perforations extending through the tipping paper.

14. The smoking article of claim 1, wherein:
the heat generation segment has a length of about 5 mm to about 30 mm; and
the aerosol-generation segment has an overall length of about 10 mm to about 60 mm.

\* \* \* \* \*